United States Patent Office 2,951,035
Patented Aug. 30, 1960

2,951,035

METHOD FOR THE REMOVAL OF METAL CONTAMINANTS FROM PETROLEUM RESIDUAL STOCKS

Walter F. Lorenc, Harvey, Ill., Carl D. Keith, Munster, Ind., and William P. Hettinger, Jr., Dolton, Ill., assignors to Sinclair Refining Company, New York, N.Y., a corporation of Maine No Drawing. Filed Sept. 6, 1957, Ser. No. 682,267

2 Claims. (Cl. 208—253)

Our invention relates to a method for the removal of metal contaminants from petroleum residual stocks.

Petroleum residual stocks, such as topped crude, reduced crude, vacuum reduced crude, bottoms from the propane deasphalting of reduced crude and the like, almost invariably contain compounds of metals such as nickel and vanadium. The presence of such compounds in the residual oils render them much less desirable for use as such as fuels and also as feed stocks for further refinery processing wherein solid catalysts are utilized, inasmuch as they tend to contaminate the catalyst.

In accordance with our present invention we have discovered that hematite ores having a surface area of at least about 20 square meters per gram, and preferably at least about 30 square meters per gram, are very effective agents for use in the removal of metal compounds from petroleum residual stocks and we have devised a method whereby the metallic contaminants can be removed from such stocks with the aid of these hematite ores. The surface area of the ore can be as high as desired and a number of ores have areas falling in the range of about 20 to 100 square meters per gram. We accomplish the removal of the metal compounds by passing the petroleum residual stocks into contact with the hematite ore at a temperature within the range from 750° F. to 950° F. and at a pressure of from atmospheric to 3000 p.s.i.g. The residual stock is contacted with the hematite ore at a weight hourly space velocity (weight units of residual stock per weight unit of hematite ore per hour) of from 0.3 to 7.5 and the stock is contacted with the ore while the stock is in admixture with hydrogen in the amount of from 200 to 7000 standard cubic feet of hydrogen per barrel of residual stock. Preferably, the reaction temperature is within the range from 775° F. to 875° F., the reaction pressure is within the range from 500 p.s.i.g. to 1500 p.s.i.g., the weight hourly space velocity is within the range from 0.5 to 2 and the hydrogen rate is from 2000 to 4000 standard cubic feet of hydrogen per barrel of residual stock. In contacting the residual stock with the hematite, a fixed bed, a moving bed, a fluidized bed or a slurry system of hematite particles can be utilized, and in fixed bed and moving bed operation the mixture of hydrogen and feed stock can be passed downwardly or upwardly through the bed.

Not only is our process advantageous in that it effects removal of metal compounds from the oil, but it is also advantageous in that the liquid product recovery is high and, in comparison with the feed, is of increased API gravity and hydrogen content and of decreased sulfur and carbon value. Moreover, the practice of our process results in a relatively low production of coke. The hematite ore catalyst which we employ, although highly effective, is inexpensive, so that when it has become deactivated it can be discarded and replaced by a fresh quantity of ore. On the other hand, the catalytic material which we use, upon deactiavtion, can conveniently be regenerated to restore its activity by removal of coke through burning.

The oil which has been treated with hydrogen in accordance with our invention in the presence of the hematite ore catalyst can be utilized as such as fuel or, on the other hand, it can be employed as a feed stock for further refinery processing, such as hydrocracking in the presence of a catalyst composed of a mixture of cobalt oxide and molybdenum oxide supported on alumina to produce gasoline and other valuable products. For such an operation to be carried out, the effluent from the reaction system in which our process is carried out can be simply introduced into a hydrocracking system, further amounts of hydrogen gas also being introduced into the hydrocracking system, if desired.

The following examples illustrate various embodiments which fall within the scope of our invention and further illustrate the practice thereof.

EXAMPLES I TO IV

The petroleum residual stock employed as the feed in the examples was a deasphalted oil produced from asphalt which was produced in the vacuum distillation of crude. To provide the deasphalted oil, the asphalt was extracted with a butane-pentane blend containing 42 volume percent of pentane to obtain 82 weight percent of the deasphalted oil, based upon the weight of the asphalt. The deasphalted oil contained 1.04 weight percent pentane insolubles and had the characteristics set forth in Table I below. Table I also includes the characteristics of the asphalt which was extracted with the butane-pentane blend in order to provide the deasphalted oil.

Table I

|  | Asphalt | Deasphalted Oil, 82 Wt. Percent Yield on Asphalt |
|---|---|---|
| API Gravity | | 13.2 |
| Percent Carbon | | 86.13 |
| Percent Hydrogen | 10.34 | 10.91 |
| Percent Sulfur | 2.23 | 2.05 |
| Percent Nitrogen | | 0.60 |
| Percent Oxygen | | 0.32 |
| Conradson Carbon | 16.21–16.41 | 12.03 |
| Ramsbottom Carbon | | 10.7 |
| Percent Ash | | 0.019 |
| Kin. Vis. at 210° F. SUS | | 1,789 |
| Viscosity, FV/210° F | 605.1 | |
| Viscosity, FV/275° F | 80.8 | |
| Insolubles in Benzene | 0.22 | |
| Insolubles in CCl$_4$ | | 0.22 |
| Insolubles in CS$_2$ | | 0.533 |
| Insolubles in nC$_5$ | | 0.462 |
| Molecular Weight | 990–995 | 1.04 |
| Percent Chloride | | 893 |
| Emission Spec., p.p.m. NiO | | less than 0.05 |
| Emission Spec., p.p.m. V$_2$O$_5$ | | 62 |
| Penetration, 77° F | 241 | 224 |
| Ring and Ball, ° F | 100 | |

In carrying out the various examples, the catalyst was charged to a heated one-inch diameter reactor. The void space above and below the catalyst bed was packed with solid glass beads, and glass wool plugs were employed to retain the catalyst particles in place. The reactor was sealed in place in a bronze block furnace, a hydrogen rate of approximately 5 standard cubic feet per hour at atmospheric pressure was established through the reactor and the heat to the furnace was turned on. The temperature was brought up to reaction temperature and held there for several hours, after which the system was pressured up with hydrogen to the desired pressure and hydrogen flow established.

The feed stock was then introduced at a predetermined rate, both the hydrogen and feed stock passing downwardly through the catalyst bed. A processing run of approximately 30–40 minutes was made in order to line out temperatures and rates and to establish steady state conditions. An attempt was made to split each experiment into four separate sections (A, B, C and D), each of approximately 20–30 minutes duration in order to follow any change in demetalization activity of the catalyst, as well as any change of other product properties. Some difficulties were encountered, so that it was not possible in all cases to split the overall run into four separate sections. The off-gases from the reactor went through a series of Dry Ice-acetone traps, gas sampler and wet test meter.

Further information concerning the manner in which the various examples were carried out and the test results are set forth in Table II. In Example IV the hematite ore, after having been brought up to approximately reaction temperature in the presence of hydrogen at atmospheric pressure and before pressuring with hydrogen, was presulfided by passing hydrogen sulfide gas into contact with the ore at atmospheric pressure.

*Table II*

| Example | I | | II | | | | III | | | | IV | | |
|---|---|---|---|---|---|---|---|---|---|---|---|---|---|
| Fraction | A | B | A | B | C | D | A | B | C | D | A | B | C [3] |
| Catalyst Description | Iron Ore (Hematite-$Fe_2O_3$), 8–14 Mesh | | Iron Ore (Hematite-$Fe_2O_3$), 8–14 Mesh | | | | Iron Ore (Hematite-$Fe_2O_3$), 8–14 Mesh | | | | Presulfided Iron Ore (Hematite-$Fe_2O_3$), 8–14 Mesh | | |
| Conditions: | | | | | | | | | | | | | |
| Temp., °F | 805 | 805 | 859 | 855 | 852 | 850 | 750 | 750 | 750 | 750 | 805 | 805 | 805 |
| Pressure, p.s.i.g. | 1,000 | 1,000 | 1,000 | 1,000 | 1,000 | 1,000 | 1,000 | 1,000 | 1,000 | 1,000 | 1,000 | 1,000 | 1,000 |
| WHSV [1] | 0.9 | 1.0 | 1.0 | 1.0 | 1.0 | 1.0 | 1.0 | 1.0 | 1.0 | 1.0 | 1.0 | 1.0 | 1.0 |
| $H_2$ Rate, s.c.f./bbl | 3,780 | 3,780 | 3,780 | 3,780 | 3,780 | 3,780 | 3,780 | 3,780 | 3,780 | 3,780 | 3,780 | 3,780 | 3,780 |
| Catalyst Charge, g | 423 | 423 | 423 | 423 | 423 | 423 | 423 | 423 | 423 | 423 | 423 | 423 | 423 |
| Direction of flow | Downflow | | Downflow | | | | Downflow | | | | Downflow | | |
| Recoveries, Wt. Percent—Uncorrected: | | | | | | | | | | | | | |
| $C_{6+}$ | 95.3 | | 92.6 | | | | 97.4 | | | | 95.7 | | |
| Coke | [2] 2.5 | | 3.2 | | | | 1.2 | | | | 1.9 | | |
| Liquid Product—Analytical Results: | | | | | | | | | | | | | |
| API Gravity | 19.9 | 18.8 | 30.7 | 24.5 | 24.3 | 22.5 | 15.7 | 15.0 | 14.8 | 14.7 | 18.5 | 17.4 | 17.4 |
| Percent Sulfur | 0.72 | 0.85 | 0.55 | 0.50 | 0.61 | 0.72 | 1.19 | 1.26 | 1.40 | 1.44 | 0.98 | 1.16 | 1.23 |
| Percent Nitrogen | 0.48 | 0.57 | 0.38 | 0.56 | 0.51 | 0.53 | 0.43 | 0.47 | 0.46 | 0.42 | 0.45 | 0.45 | 0.47 |
| Ramsbottom Carbon | ([4]) | 5.82 | 2.27 | 5.14 | 5.12 | 6.30 | 7.40 | 8.70 | 8.51 | 9.10 | 7.27 | 7.82 | 7.95 |
| Emission Spec.— | | | | | | | | | | | | | |
| p.p.m. NiO | 3.7 | 5.1 | 2.1 | 2.6 | 3.1 | 5.1 | 20 | 25 | 28 | 28 | 13 | 11 | 11 |
| p.p.m. $V_2O_5$ | 2.9 | 5.9 | 1.3 | 1.4 | 1.3 | 2.5 | 18 | 41 | 54 | 51 | 19 | 28 | 28 |
| Percent C | 86.07 | 85.70 | | | | | | | | | | | |
| Percent H | 11.52 | 11.46 | | | | | | | | | | | |
| Virgin Cat.—Area m.²/g | 69 | 69 | 69 | | | | 69 | | | | 69 | | |
| $H_2$ Consumption, s.c.f./bbl | 410 | 410 | | | | | | | | | | | |

[1] WHSV means weight hourly space velocity.
[2] Coke may be high due to pump priming difficulties; run terminated due to time limitations.
[3] Run terminated due to a gauge failure.
[4] Value of Ramsbottom carbon not obtained because of water interference.

The data of Table III were gathered in additional runs conducted to demetalize the feed of Table II according to the procedure used in the other examples. Example V establishes that low surface area, e.g., 4 square meters, hematite ores are not effective demetalization catalysts. In Examples VI and VII the demetalization was more effective due to the use of ores of intermediate surface area, but still these ores are not as effective as those whose surface area exceeds about 65 square meters per gram. Example VIII illustrates that iron ores which are substantially magnetic are materially less effective than the hematite ores.

*Table III*

| Example | V | | | | VI | | | |
|---|---|---|---|---|---|---|---|---|
| Fraction | A | B | C | D | A | B | C | D |
| Catalyst Description | Hematite—$Fe_2O_3$ 8–14 mesh | | | | Hematite—$Fe_2O_3$ 8–14 mesh, slightly magnetic | | | |
| Surface area, sq. m./gm. | 4 | | | | 35 | | | |
| Conditions: | | | | | | | | |
| Temp., °F | 805 | 805 | 805 | 805 | 805 | 805 | 805 | 805 |
| Pressure, p.s.i.g. | 1,000 | 1,000 | 1,000 | 1,000 | 1,000 | 1,000 | 1,000 | 1,000 |
| WHSV | 1.0 | 1.0 | 1.0 | 1.0 | 1.0 | 1.0 | 1.0 | 1.0 |
| $H_2$ rate, s.c.f./bbl | 3,780 | 3,780 | 3,780 | 3,780 | 3,780 | 3,780 | 3,780 | 3,780 |
| Catalyst charge, g | 423 | 423 | 423 | 423 | 423 | 423 | 423 | 423 |
| Direction of flow | Downflow | | | | Downflow | | | |
| Liquid Product—Analytical Results: | | | | | | | | |
| API Gravity | 16.5 | 16.1 | 15.6 | 15.2 | 18.2 | 17.5 | 17.1 | 16.9 |
| Percent Sulfur | 1.63 | 1.70 | 1.71 | 1.76 | 1.07 | 1.11 | 1.24 | 1.17 |
| Percent Nitrogen | 0.60 | 0.09 | 0.60 | 0.58 | 0.56 | 0.64 | 0.58 | 0.56 |
| Ramsbottom carbon | 8.73 | 8.70 | 9.11 | 9.44 | 7.09 | 7.73 | 7.95 | 8.07 |
| Emission spec.— | | | | | | | | |
| p.p.m. NiO | 44 | 42 | 44 | 47 | 20 | 22 | 24 | 25 |
| p.p.m. $V_2O_5$ | >100 | >100 | >100 | >100 | 54 | 66 | 92 | 86 |
| Percent Carbon on catalyst | | | 2.74 | 1.82 | | 4.64 | 3.71 | |

Table III—Continued

| Example | VII | | | | VIII | | | |
|---|---|---|---|---|---|---|---|---|
| Fraction | A | B | C | D | A | B | C | D |
| Catalyst Description | Hematite—$Fe_2O_3$ 8-14 mesh | | | | Vermillion Iron Ore 50% magnetic, 8-14 mesh | | | |
| Surface area, sq. m./gm | 56 | | | | | | | |
| Conditions: | | | | | | | | |
| Temp., °F | 805 | 805 | 805 | 805 | 805 | 805 | 805 | 805 |
| Pressure, p.s.i.g | 1,000 | 1,000 | 1,000 | 1,000 | 1,000 | 1,000 | 1,000 | 1,000 |
| WHSV | 1.0 | 1.0 | 1.0 | 1.0 | 1.0 | 1.0 | 1.0 | 1.0 |
| $H_2$ rate s.c.f./bbl | 3,780 | 3,780 | 3,780 | 3,780 | 3,780 | 3,780 | 3,780 | 3,780 |
| Catalyst charge, g | 423 | 423 | 423 | 423 | 423 | 423 | 423 | 423 |
| Direction of flow | Downflow | | | | Downflow | | | |
| Liquid Product—Analytical Results: | | | | | | | | |
| API Gravity | 18.6 | 17.3 | 17.3 | 16.8 | 14.8 | 15.0 | 14.9 | 14.5 |
| Percent Sulfur | 0.89 | 1.09 | 1.17 | 1.23 | 1.50 | 1.66 | 1.73 | 1.70 |
| Percent Nitrogen | 0.55 | 0.58 | 0.60 | 0.58 | 0.60 | 0.56 | 0.61 | 0.60 |
| Ramsbottom carbon | 6.71 | 8.18 | 8.05 | 8.23 | 9.93 | 9.77 | 9.97 | 9.80 |
| Emission spec.— | | | | | | | | |
| p.p.m. NiO | 16.2 | 19.7 | 21.8 | 26.4 | 55.5 | 60 | 64 | 64 |
| p.p.m. $V_2O_5$ | 25.6 | 51.4 | 72.0 | 81.0 | 163 | 145 | 140 | 140 |
| Percent Carbon on catalyst | | 4.56 | 2.74 | | | 1.85 | 0.65 | |

We claim:

1. A method for the removal of metallic contaminants from a petroleum residual stock containing the same which comprises passing the stock into contact with non-magnetic hematite ore having a surface area of at least about 20 square meters per gram at a temperature of from 750° F. to 950° F., a pressure of from atmospheric to 3000 p.s.i.g. and at a weight hourly space velocity of from 0.3 to 7.5 while the stock is in admixture with hydrogen in the amount of from 200 to 7000 standard cubic feet per barrel.

2. A method for the removal of metallic contaminants from a petroleum residual stock containing the same which comprises passing the stock into contact with non-magnetic hematite ore having a surface area of at least about 30 square meters per gram at a temperature of from 775 to 875° F., a pressure of from 500 to 1500 p.s.i.g. and at a weight hourly space velocity of from 0.5 to 2 while the stock is in admixture with hydrogen in the amount of from 2000 to 4000 standard cubic feet per barrel.

References Cited in the file of this patent

UNITED STATES PATENTS

| 1,882,000 | Cross | Oct. 11, 1932 |
| 2,614,067 | Reed et al. | Oct. 14, 1952 |
| 2,717,855 | Nicholson | Sept. 13, 1955 |

FOREIGN PATENTS

| 735,520 | Great Britain | Aug. 24, 1955 |